(12) United States Patent
Fuh et al.

(10) Patent No.: US 8,072,507 B2
(45) Date of Patent: Dec. 6, 2011

(54) METHOD AND SYSTEM OF GENERATING HIGH DYNAMIC RANGE IMAGE CORRESPONDING TO SPECIFIC SCENE

(75) Inventors: Chiou-Shann Fuh, Taipei County (TW);
Kun-Yi Chen, Kao-Hsiung (TW);
Chen-Ning Hsi, Taipei (TW);
Wen-Lung Chou, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 628 days.

(21) Appl. No.: 11/621,117

(22) Filed: Jan. 9, 2007

(65) Prior Publication Data
US 2008/0094486 A1    Apr. 24, 2008

(30) Foreign Application Priority Data
Oct. 20, 2006    (TW) ................................ 95138655 A

(51) Int. Cl.
*H04N 5/235* (2006.01)
(52) U.S. Cl. ..................................... 348/229.1; 348/234
(58) Field of Classification Search ............... 348/222.1, 348/229.1, 362, 365, 234
See application file for complete search history.

(56) References Cited

U.S. PATENT DOCUMENTS

| | | | |
|---|---|---|---|
| 5,053,888 A * | 10/1991 | Nomura ....................... 358/3.22 |
| 5,101,276 A * | 3/1992 | Ohta ............................ 348/221.1 |
| 5,247,366 A * | 9/1993 | Ginosar et al. ................. 348/256 |
| 5,309,243 A * | 5/1994 | Tsai ............................. 348/221.1 |
| 5,420,635 A * | 5/1995 | Konishi et al. ................. 348/362 |
| 5,510,837 A * | 4/1996 | Takei ............................. 348/362 |
| 5,589,880 A * | 12/1996 | Tsukui ......................... 348/229.1 |
| 5,724,456 A * | 3/1998 | Boyack et al. ................. 382/274 |
| 5,801,773 A * | 9/1998 | Ikeda .......................... 348/229.1 |
| 5,818,975 A * | 10/1998 | Goodwin et al. ............. 382/274 |
| 5,828,793 A * | 10/1998 | Mann ........................... 382/284 |
| 5,929,908 A * | 7/1999 | Takahashi et al. ............. 348/364 |
| 5,969,761 A * | 10/1999 | Takahashi et al. ............. 348/362 |
| 6,040,858 A * | 3/2000 | Ikeda ............................ 348/242 |
| 6,177,958 B1 * | 1/2001 | Anderson ..................... 348/362 |
| 6,204,881 B1 * | 3/2001 | Ikeda et al. .................... 348/362 |
| 6,496,226 B2 * | 12/2002 | Takahashi et al. ............. 348/362 |
| 6,687,400 B1 * | 2/2004 | Szeliski ......................... 382/168 |
| 6,765,619 B1 * | 7/2004 | Deng et al. .................... 348/362 |
| 6,975,355 B1 * | 12/2005 | Yang et al. .................... 348/308 |
| 7,061,524 B2 * | 6/2006 | Liu et al. ..................... 348/208.4 |
| 7,133,069 B2 * | 11/2006 | Wallach et al. ............. 348/218.1 |
| 7,271,838 B2 * | 9/2007 | Suekane et al. ........... 348/333.02 |
| 7,301,563 B1 * | 11/2007 | Kakinuma et al. ....... 348/208.13 |
| 7,349,119 B2 * | 3/2008 | Tsukioka ..................... 358/1.18 |
| 7,372,487 B2 * | 5/2008 | Horiuchi ....................... 348/254 |

(Continued)

*Primary Examiner* — Tuan Ho
(74) *Attorney, Agent, or Firm* — Winston Hsu; Scott Margo

(57) ABSTRACT

A method of generating a high dynamic range image corresponding to a specific scene. The method includes shooting a specific scene to generate a base image; selecting a bright area and a dark area from the base image; determining base luminance according to the base image; shooting the specific scene to generate at least a first image, wherein average luminance of a part of the first image corresponding to the bright area of the base image is less than or equal to the base luminance; shooting the specific scene to generate at least a second image, wherein average luminance of a part of the second image corresponding to the dark area of the base image is greater than or equal to the base luminance; and combining at least the first image and the second image into a high dynamic range image corresponding to the specific scene.

22 Claims, 3 Drawing Sheets

U.S. PATENT DOCUMENTS

| | | | |
|---|---|---|---|
| 7,409,101 B2 * | 8/2008 | Von Thal et al. | 382/254 |
| 7,409,104 B2 * | 8/2008 | Vitsnudel et al. | 382/284 |
| 7,495,699 B2 * | 2/2009 | Nayar et al. | 348/239 |
| 7,548,689 B2 * | 6/2009 | Yap et al. | 396/234 |
| 7,565,071 B2 * | 7/2009 | Lin et al. | 396/121 |
| 7,573,533 B2 * | 8/2009 | Moldvai | 348/678 |
| 7,612,813 B2 * | 11/2009 | Hunter | 348/297 |
| 7,626,614 B1 * | 12/2009 | Marcu | 348/222.1 |
| 2002/0176010 A1 * | 11/2002 | Wallach et al. | 348/229.1 |
| 2003/0030743 A1 * | 2/2003 | Takahashi et al. | 348/362 |
| 2003/0210345 A1 * | 11/2003 | Nakamura et al. | 348/362 |
| 2004/0207734 A1 * | 10/2004 | Horiuchi | 348/229.1 |
| 2005/0046708 A1 * | 3/2005 | Lim et al. | 348/231.6 |
| 2005/0099504 A1 * | 5/2005 | Nayar et al. | 348/222.1 |
| 2005/0104974 A1 * | 5/2005 | Watanabe et al. | 348/222.1 |
| 2006/0023099 A1 * | 2/2006 | Vitsnudel et al. | 348/312 |
| 2006/0114333 A1 * | 6/2006 | Gokturk et al. | 348/222.1 |
| 2006/0204055 A1 * | 9/2006 | Steinberg et al. | 382/118 |
| 2007/0216777 A1 * | 9/2007 | Quan et al. | 348/222.1 |
| 2008/0055440 A1 * | 3/2008 | Pertsel et al. | 348/297 |

* cited by examiner

METHOD AND SYSTEM OF GENERATING HIGH DYNAMIC RANGE IMAGE CORRESPONDING TO SPECIFIC SCENE

BACKGROUND OF THE INVENTION

1. Field of the Invention

The present invention relates to a high dynamic range image, and more particularly, to a method and system of generating a high dynamic range image corresponding to a specific scene.

2. Description of the Prior Art

In image processing technical fields, the ratio of the highest luminance to the lowest luminance in a scene is defined as a dynamic range of the scene. Typically, the dynamic range of the real world is over 50,000:1, and the dynamic range of the human vision system (HVS) is over 10,000:1. Moreover, in some specific lighting condition, human eyes can differentiate some 10,000 colors. Thus, human eyes can detect different luminance in the real word to a fairly satisfactory degree.

Image capturing devices (such as cameras) or image display devices (such as computer displays) commonly used for processing images, however, have a dynamic range far less than the dynamic range of the real world. Therefore, those image devices are unable to capture or display details of high luminance (i.e. over-exposure) or low luminance (i.e. under-exposure) parts in a scene in some condition. For example, an image capturing device or an image display device having a dynamic range of 255:0 may treat all pixels in a high luminance part in a scene as white pixels having grayscale values of (255, 255, 255), or treat all pixels in a low luminance part in a scene as black pixels having grayscale values of (0, 0, 0). In other words, those image devices are unable to record details of high luminance or low luminance parts in a scene.

Generally, an image having a high dynamic range is called a high dynamic range (HDR) image. Presently, there is no simple and direct way to capture or display an HDR image. Therefore, an alternative method to execute multiple exposures in a scene to capture a plurality of low dynamic range (LDR) images and then combine the LDR images into an HDR image of the scene is provided.

Traditionally, multiple exposures are executed in a scene to capture a plurality of LDR images until the amount of LDR images is sufficient to generate a satisfactory HDR image, thereby consuming a lot of shooting time and storage space for the LDR images.

SUMMARY OF THE INVENTION

One aim of the present invention is to provide a method and system of generating a high dynamic range image corresponding to a specific scene, to solve the above-mentioned problems.

According to an embodiment of the present invention, the present invention discloses a method of generating a high dynamic range image corresponding to a specific scene. The method comprises shooting a specific scene to generate a base image; selecting a bright area and a dark area from the base image; determining base luminance according to the base image; shooting the specific scene to generate at least a first image, wherein average luminance of a part of the first image corresponding to the bright area of the base image is less than or equal to the base luminance; shooting the specific scene to generate at least a second image, wherein average luminance of a part of the second image corresponding to the dark area of the base image is greater than or equal to the base luminance; and combining at least the first image and the second image into a high dynamic range image corresponding to the specific scene.

According to another embodiment of the present invention, the present invention discloses a system of generating a high dynamic range image corresponding to a specific scene. The system comprises a shooting unit, for shooting a specific scene to generate a base image, at least a first image, and at least a second image; a deciding unit, coupled to the shooting unit, for selecting a bright area and a dark area from the base image, and determining base luminance according to the base image; and a combining unit, coupled to the shooting unit, for combining at least the first image and the second image into a high dynamic range image corresponding to the specific scene; wherein average luminance of a part of the first image corresponding to the bright area of the base image is less than or equal to the base luminance, and average luminance of a part of the second image corresponding to the dark area of the base image is greater than or equal to the base luminance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
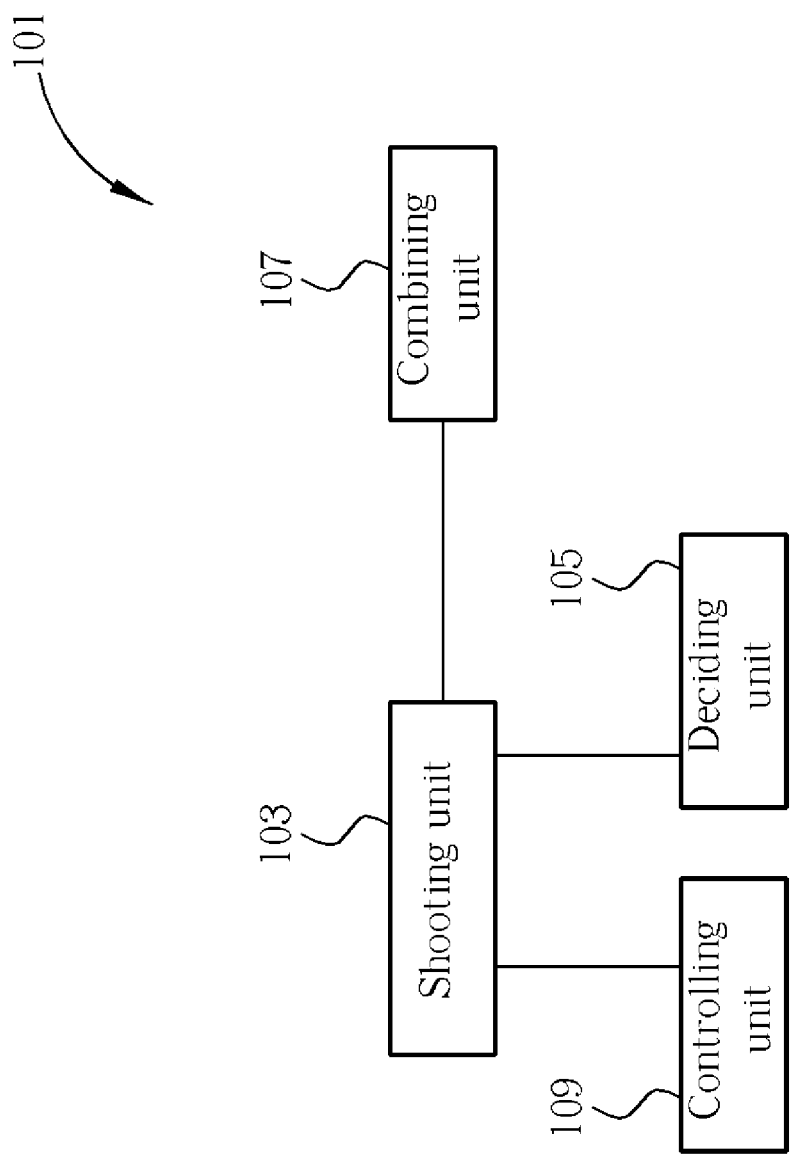
FIG. 1 is a block diagram illustrating a system of generating a high dynamic range image corresponding to a specific scene according to an embodiment of the present invention.

Please refer to FIG. 1. FIG. 1 is a block diagram illustrating a system 101 of generating a high dynamic range (HDR) image corresponding to a specific scene according to an embodiment of the present invention. As shown, the system 101 comprises a shooting unit 103, a deciding unit 105, a combining unit 107, and a controlling unit 109. The shooting unit 103 is coupled to the deciding unit 105, the combining unit 107, and the controlling unit 109 respectively.

Figure 2:
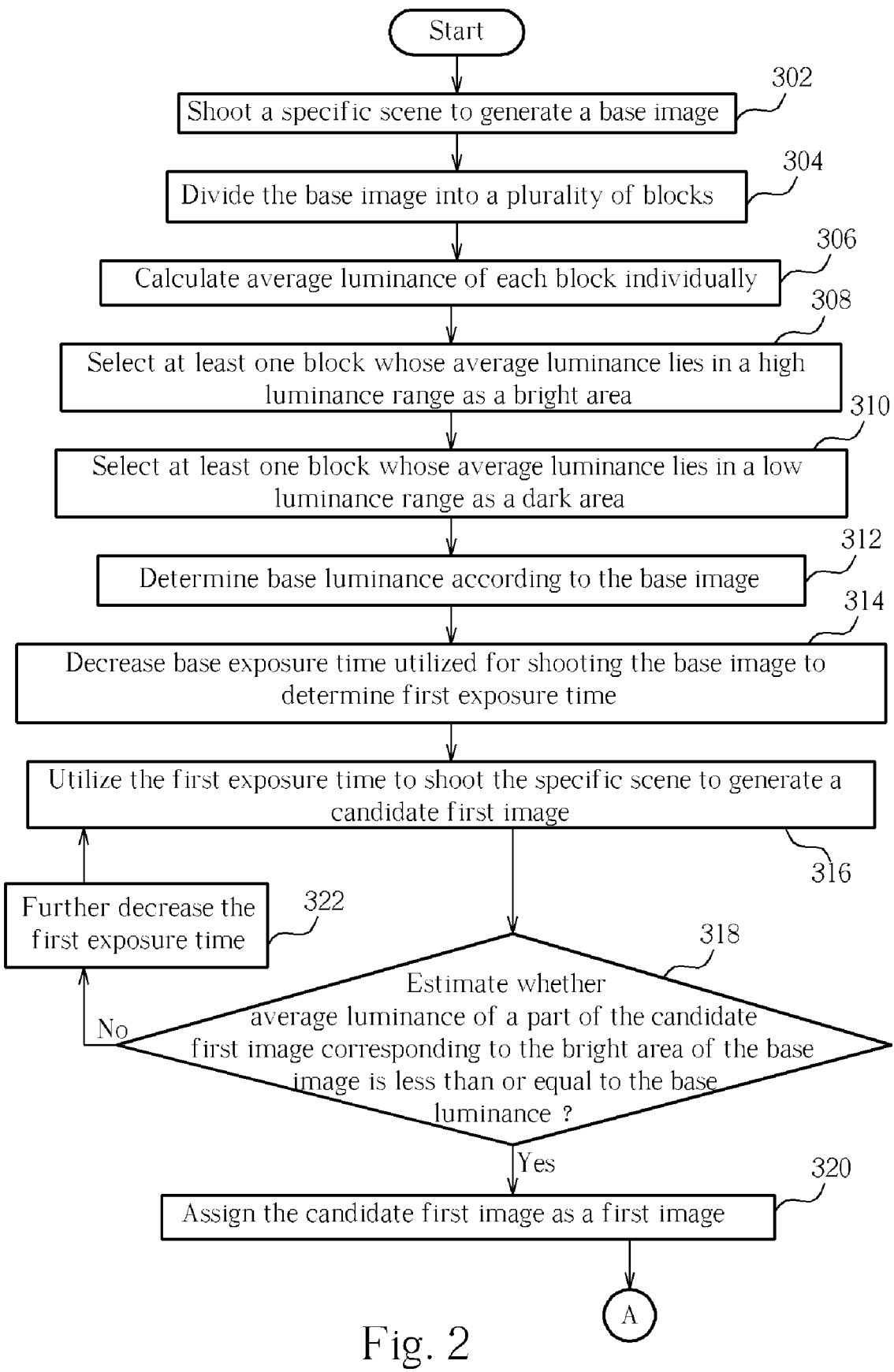
FIG. 2 is a flowchart of a method of generating a high dynamic range image corresponding to a specific scene according to an embodiment of the present invention.
Figure 3:
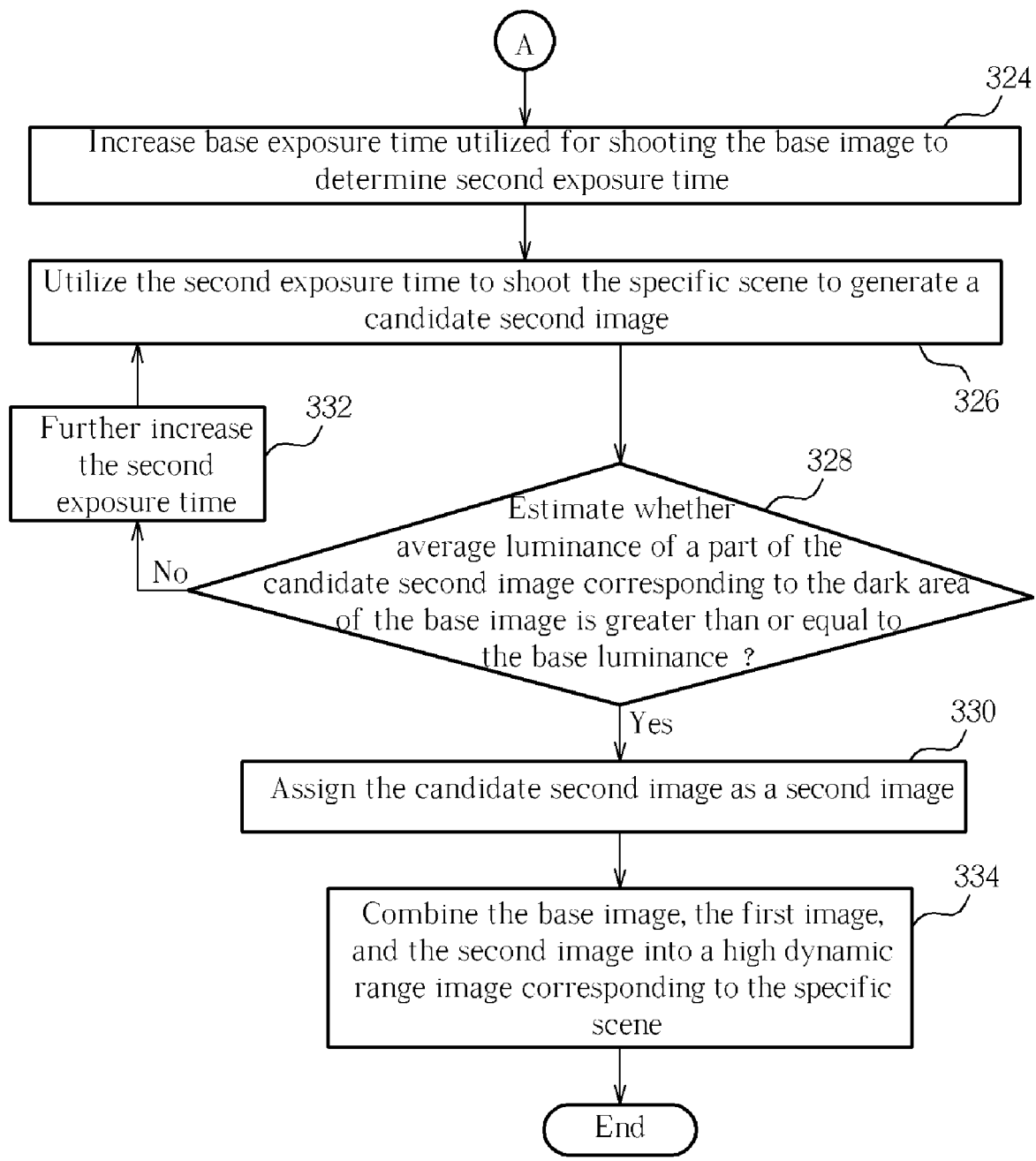
FIG. 3 is a continued flowchart of FIG. 2.

Please refer to FIG. 2 and FIG. 3. FIG. 2 is a flowchart of a method of generating an HDR image corresponding to a specific scene according to an embodiment of the present invention. FIG. 3 is a continued flowchart of FIG. 2. As shown, the method comprises the following steps:

STEP 302: Shoot a specific scene to generate a base image;
STEP 304: Divide the base image into a plurality of blocks;
STEP 306: Calculate average luminance of each block individually;
STEP 308: Select at least one block whose average luminance lies in a high luminance range as a bright area;
STEP 310: Select at least one block whose average luminance lies in a low luminance range as a dark area;
STEP 312: Determine base luminance according to the base image;
STEP 314: Decrease base exposure time utilized for shooting the base image to determine first exposure time;
STEP 316: Utilize the first exposure time to shoot the specific scene to generate a candidate first image;
STEP 318: Estimate whether average luminance of a part of the candidate first image corresponding to the bright area of the base image is less than or equal to the base luminance? If positive, proceed to STEP 320, otherwise to STEP 322;

STEP 320: Assign the candidate first image as a first image;

STEP 322: Further decrease the first exposure time, and then return to STEP 316;

STEP 324: Increase base exposure time utilized for shooting the base image to determine second exposure time;

STEP 326: Utilize the second exposure time to shoot the specific scene to generate a candidate second image;

STEP 328: Estimate whether average luminance of a part of the candidate second image corresponding to the dark area of the base image is greater than or equal to the base luminance? If positive, proceed to STEP 330, otherwise to STEP 332;

STEP 330: Assign the candidate second image as a second image;

STEP 332: Further increase the second exposure time, and then return to STEP 326; and STEP 334: Combine the base image, the first image, and the second image into a high dynamic range image corresponding to the specific scene.

The operation regarding how the system 101 in FIG. 1 executes the method in FIG. 2 is described in detail as follows. First, the shooting unit 103 shoots a specific scene to generate a base image (STEP 302). In this embodiment, the shooting unit 103 utilizes automatic exposure technology to shoot the specific scene to generate the base image. Typically, the automatic exposure technology first decides a subject in the specific scene and then decides appropriate exposure time according to the subject. Further, the deciding unit 105 divides the base image into a plurality of blocks (STEP 304) and calculates average luminance of each block individually (STEP 306). In this embodiment, the deciding unit 105 divides the base image into 9×9 (i.e. 81) blocks. For each block, the deciding unit 105 averages luminance of all pixels in the block to get average luminance of the block. Additionally, luminance of each pixel can be calculated according to the following equation:

luminance=$0.299R+0.587G+0.114B$, wherein R, G, B respectively represents grayscale values of a red portion, a green portion, and a blue portion contained in each pixel. Further, the deciding unit 105 selects at least one block whose average luminance lies in a high luminance range as a bright area of the base image (STEP 308) and selects at least one block whose average luminance lies in a low luminance range as a dark area of the base image (STEP 310). In this embodiment, the deciding unit 105 selects 9 blocks having relatively high luminance in the base image as the bright area, and 9 blocks having relatively low luminance in the base image as the dark area.

The deciding unit 105 then determines base luminance according to the base image (STEP 312). In this embodiment, deciding unit 105 selects at least one block whose average luminance lies in a median luminance range as a median area of the base image, and then calculates average luminance of the median area to be the base luminance. Additionally, the deciding unit 105 selects 17 blocks having relatively median luminance in the base image as the median area. Moreover, in another embodiment, the deciding unit 105 can calculate average luminance of the bright area and the dark area as a whole to be the base luminance. In still another embodiment, the deciding unit 105 can utilize subject luminance of the base image as the base luminance. In still another embodiment, the deciding unit 105 can utilize average luminance of the base image as the base luminance.

The controlling unit 109 then decreases base exposure time utilized for shooting the base image by the shooting unit 103 to determine first exposure time (STEP 314). In this embodiment, the shooting unit 103 utilizes automatic exposure technology to decide the base exposure time as 0.005 second, and the controlling unit 109 decreases 0.005 second to 0.004 second as the first exposure time. In other words, the controlling unit 109 subtracts 0.001 second from 0.005 second to get the first exposure time (i.e. 0.004 second). Further, the shooting unit 103 utilizes the first exposure time to shoot the specific scene to generate a candidate first image (STEP 316). The deciding unit 105 then estimates whether average luminance of a part of the candidate first image corresponding to the bright area of the base image is less than or equal to the base luminance (STEP 318). Additionally, the corresponding part in the candidate first image contains exactly the same image in the bright area of the base image except for luminance. For example, if a window in the base image happens to occupy the 9 blocks having relatively high luminance in the base image (i.e. the bright area), the corresponding part in the candidate first image will thus refer to the same window. Please note that, in this embodiment, the corresponding part in the candidate first image does not necessarily correspond to the 9 blocks having relatively high luminance in the candidate first image. Referring to the above example, the window in the candidate first image does not necessarily correspond to the 9 blocks having relatively high luminance in the candidate first image.

If the average luminance of the part of the candidate first image corresponding to the bright area of the base image is estimated by the deciding unit 105 in the step 318 to be certainly less than or equal to the base luminance, the deciding unit 105 will assign the candidate first image as a first image (STEP 320). Contrarily, if the average luminance of the part of the candidate first image corresponding to the bright area of the base image is not less than or equal to the base luminance, the controlling unit 109 will further decrease the first exposure time (STEP 322). In this embodiment, the controlling unit 109 further decreases the first exposure time from 0.004 second to 0.003 second. In other words, the controlling unit 109 subtracts 0.001 second from 0.004 second to get new first exposure time (i.e. 0.003 second). The process then returns to the step 316 where the new first exposure time is utilized to shoot the specific scene again to further generate another candidate first image. The another candidate first image will thus be estimated again in the step 318. Additionally, the above-mentioned steps (i.e. STEPs 316, 318, and 322) are executed repeatedly until the system 101 generates at least one first image.

The controlling unit 109 then increases base exposure time utilized for shooting the base image by the shooting unit 103 to determine second exposure time (STEP 324). As mentioned above, in this embodiment, the shooting unit 103 utilizes automatic exposure technology to decide the base exposure time as 0.005 second, and the controlling unit 109 increases 0.005 second to 0.006 second as the second exposure time. In other words, the controlling unit 109 adds 0.001 second to 0.005 second to get the second exposure time (i.e. 0.006 second). Further, the shooting unit 103 utilizes the second exposure time to shoot the specific scene to generate a candidate second image (STEP 326). The deciding unit 105 then estimates whether average luminance of a part of the candidate second image corresponding to the dark area of the base image is greater than or equal to the base luminance (STEP 328). Additionally, the corresponding part in the candidate second image contains exactly the same image in the dark area of the base image except for luminance. For example, if a tablecloth in the base image happens to occupy the 9 blocks having relatively low luminance in the base image (i.e. the dark area), the corresponding part in the candidate second image will thus refer to the same tablecloth. Please note that, in this embodiment, the corresponding part in the candidate second image does not necessarily correspond to the 9 blocks having relatively low luminance in the candidate second image. Referring to the above example, the tablecloth in the candidate second image does not necessarily correspond to the 9 blocks having relatively low luminance in the candidate second image.

If the average luminance of the part of the candidate second image corresponding to the dark area of the base image is estimated by the deciding unit 105 in the step 328 to be certainly greater than or equal to the base luminance, the deciding unit 105 will assign the candidate second image as a second image (STEP 330). Contrarily, if the average luminance of the part of the candidate second image corresponding to the dark area of the base image is not greater than or equal to the base luminance, the controlling unit 109 will further increase the second exposure time (STEP 332). In this embodiment, the controlling unit 109 further increases the second exposure time from 0.006 second to 0.007 second. In other words, the controlling unit 109 adds 0.001 second to 0.006 second to get new second exposure time (i.e. 0.007 second). The process then returns to the step 326 where the new second exposure time is utilized to shoot the specific scene again to further generate another candidate second image. The another candidate second image will thus be estimated again in the step 328. Additionally, the above-mentioned steps (i.e. STEPs 326, 328, and 332) are executed repeatedly until the system 101 generates at least one second image.

Please note that, in this embodiment, the first exposure time is decreased and the second exposure time is increased by the same value (i.e. 0.001 second). However, in another embodiment, the first exposure time can be decreased and the second exposure time be increased by different values. For example, the first exposure time can be decreased by a value of 0.0002 second, and the second exposure time can be increased by another value of 0.0003 second.

Finally, the combining unit 107 combines the base image, the first image, and the second image into an HDR image corresponding to the specific scene (STEP 334). In this embodiment, the combining unit 107 combines the base image, the first image, and the second image into the HDR image corresponding to the specific scene according to a response function g of the specific scene. Specifically, the combining unit 107 first calculates the response function g of the specific scene based on a plurality of pixel values in the base image, the first image, and the second image. The combining unit 107 then gets correct scene radiance according to the response function g. Finally, the combining unit 107 adjusts over-exposure or under-exposure parts in the images, thereby generating the HDR image corresponding to the specific scene. The response function g is shown as follows:

$$g(Z_{ij}) = lnE_i + ln\Delta t_j,$$

wherein $Z_{ij}$ represents the $i^{th}$ pixel value in the $j^{th}$ image, $E_i$ represents scene radiance corresponding to the $j^{th}$ pixel value, and $\Delta t_j$ represents exposure time corresponding to the $j^{th}$ image. Please note that, in this embodiment, the combining unit 107 can perform the above combination calculation in a hardware or software style. Additionally, in another embodiment, the combining unit 107 can perform the above combination calculation by a user through a user interface.

Please note that, although the combining unit 107 combines 3 images (i.e. the base image, the first image, and the second image) into the HDR image of the specific scene in this embodiment, the combining unit 107 can also combine more than 3 images into the HDR image of the specific scene in another embodiment. For example, the system 101 can generate a plurality of first images and second images according to the principle of the present invention as disclosed above. Therefore, the combining unit 107 can combine the base image, the first images, and the second images into the HDR image corresponding to the specific scene. Additionally, in still another embodiment, 2 images, for example, the first image and the second image, are sufficient for the combining unit 107 to generate the HDR image corresponding to the specific scene.

In the present invention, the system 101 can be a digital camera, and the shooting unit 103, the deciding unit 105, the combining unit 107, and the controlling unit 109 are disposed in the digital camera. However, the system 101 can also be achieved by a plurality of individual devices or units. For example, the shooting unit 103 and the controlling unit 109 can be disposed in a traditional camera. The deciding unit 105 and the combining unit 107 can be disposed in a computer or achieved by computer software. Therefore, the traditional camera and the computer as a whole can also be referred to as the system 101 of the present invention. Additionally, the base image, the first image, or the second image generated in the traditional camera is thus transferred to the computer for further calculation, thereby achieving the method of the present invention as disclosed above.

The present invention provides a method and system of generating an HDR image corresponding to a specific scene. Utilizing the method, the system can determine necessary images more efficiently and more precisely, and then combine the images into an HDR image corresponding to a specific scene. Furthermore, an embodiment of the present invention can also determine the least but sufficient number of images, or the most appropriate images, thereby saving overall shooting time and storage space for images. For example, in an environment having high lighting contrast, an embodiment of the present invention needs only 2 images to generate a satisfactory HDR image showing details of both high luminance and low luminance parts corresponding to a specific scene.

Please note that, the principle of the present invention as disclosed in the above embodiments can be applied in various image processing devices, including image capturing devices (such as digital cameras) and image display devices (such as computer displays). After understanding the principle of the present invention as disclosed in the above embodiments, those skilled in this art can easily apply the present invention in other related technical fields. Additionally, after understanding the principle of the present invention as disclosed in the above embodiments, those skilled in electronic circuit design, signal processing, or image processing can easily implement the method and system of generating an HDR image corresponding to a specific scene of the present invention in any hardware or software style.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating a high dynamic range (HDR) image corresponding to a specific scene, comprising:

shooting a specific scene to generate a base image;

selecting a bright area and a dark area from the base image;
determining base luminance according to the base image;
shooting the specific scene to generate at least a first image, wherein average luminance of a part of the first image corresponding to the bright area of the base image is less than or equal to the base luminance;
shooting the specific scene to generate at least a second image, wherein average luminance of a part of the second image corresponding to the dark area of the base image is greater than or equal to the base luminance; and
combining at least the first image and the second image into an HDR image corresponding to the specific scene;
wherein the step of selecting the bright area and the dark area from the base image comprises:
dividing the base image into a plurality of blocks;
calculating average luminance of each block individually;
for each base image generated and regardless of the luminance properties of the base image, selecting at least one block whose average luminance lies in a high luminance range as the bright area; and
for each base image generated and regardless of the luminance properties of the base image, selecting at least one block whose average luminance lies in a low luminance range as the dark area.

2. The method of claim 1, wherein the step of determining the base luminance according to the base image comprises:
selecting at least one block whose average luminance lies in a median luminance range as a median area; and
calculating average luminance of the median area to be the base luminance.

3. The method of claim 1, wherein the step of determining the base luminance according to the base image comprises:
calculating average luminance of the bright area and the dark area as a whole to be the base luminance.

4. The method of claim 1, wherein the step of determining the base luminance according to the base image comprises:
utilizing subject luminance of the base image as the base luminance.

5. The method of claim 1, wherein the step of determining the base luminance according to the base image comprises:
utilizing average luminance of the base image as the base luminance.

6. The method of claim 1, wherein the step of shooting the specific scene to generate at least a first image comprises:
decreasing base exposure time utilized for shooting the base image to determine first exposure time;
utilizing the first exposure time to shoot the specific scene to generate a candidate first image;
estimating whether average luminance of a part of the candidate first image corresponding to the bright area of the base image is less than or equal to the base luminance; and
if the estimating result is positive, assigning the candidate first image as the first image.

7. The method of claim 6, wherein the step of shooting the specific scene to generate at least a first image further comprises:
if the estimating result is negative, further decreasing the first exposure time, and executing the step of utilizing the first exposure time and the step of estimating the candidate first image again.

8. The method of claim 1, wherein the step of shooting the specific scene to generate at least a second image comprises:
increasing base exposure time utilized for shooting the base image to determine second exposure time;
utilizing the second exposure time to shoot the specific scene to generate a candidate second image;
estimating whether average luminance of a part of the candidate second image corresponding to the dark area of the base image is greater than or equal to the base luminance; and
if the estimating result is positive, assigning the candidate second image as the second image.

9. The method of claim 8, wherein the step of shooting the specific scene to generate at least a second image further comprises:
if the estimating result is negative, further increasing the second exposure time, and executing the step of utilizing the second exposure time and the step of estimating the candidate second image again.

10. The method of claim 1, wherein the step of combining at least the first image and the second image into the HDR image corresponding to the specific scene comprises:
combining the base image, the first image, and the second image into the HDR image corresponding to the specific scene.

11. The method of claim 1, wherein the step of combining at least the first image and the second image into the HDR image corresponding to the specific scene is performed according to a response function g as follows:

$$g(Z_{ij}) = \ln E_i + \ln \Delta t_j,$$

wherein $Z_{ij}$ represents the $i^{th}$ pixel value in the $j^{th}$ image, $E_i$ represents scene radiance corresponding to the $i^{th}$ pixel value, and $\Delta t_j$ represents exposure time corresponding to the $j^{th}$ image.

12. A system of generating an HDR image corresponding to a specific scene, comprising:
a shooting unit, for shooting a specific scene to generate a base image, at least a first image, and at least a second image;
a deciding unit, coupled to the shooting unit, for selecting a bright area and a dark area from the base image, and determining base luminance according to the base image, wherein for each base image generated and regardless of the luminance properties of the base image the deciding unit divides the base image into a plurality of blocks, calculates average luminance of each block individually, selects at least one block whose average luminance lies in a high luminance range as the bright area, and selects at least one block whose average luminance lies in a low luminance range as the dark area; and
a combining unit, coupled to the shooting unit, for combining at least the first image and the second image into an HDR image corresponding to the specific scene;
wherein average luminance of a part of the first image corresponding to the bright area of the base image is less than or equal to the base luminance, and average luminance of a part of the second image corresponding to the dark area of the base image is greater than or equal to the base luminance.

13. The system of claim 12, wherein the deciding unit further selects at least one block whose average luminance lies in a median luminance range as a median area, and calculates average luminance of the median area to be the base luminance.

14. The system of claim 12, wherein the deciding unit calculates average luminance of the bright area and the dark area as a whole to be the base luminance.

15. The system of claim 12, wherein the deciding unit utilizes subject luminance of the base image as the base luminance.

16. The system of claim 12, wherein the deciding unit utilizes average luminance of the base image as the base luminance.

17. The system of claim 12, further comprising:
a controlling unit, coupled to the shooting unit, for decreasing base exposure time utilized for shooting the base image by the shooting unit to determine first exposure time;
wherein the shooting unit utilizes the first exposure time to shoot the specific scene to generate a candidate first image, the deciding unit estimates whether average luminance of a part of the candidate first image corresponding to the bright area of the base image is less than or equal to the base luminance, and if the estimating result is positive, the deciding unit assigns the candidate first image as the first image.

18. The system of claim 17, wherein if the estimating result is negative, the controlling unit further decreases the first exposure time, the shooting unit utilizes the first exposure time to shoot the specific scene to generate another candidate first image, and the deciding unit estimates whether average luminance of a part of the another candidate first image corresponding to the bright area of the base image is less than or equal to the base luminance.

19. The system of claim 12, further comprising:
a controlling unit, coupled to the shooting unit, for increasing base exposure time utilized for shooting the base image by the shooting unit to determine second exposure time;
wherein the shooting unit utilizes the second exposure time to shoot the specific scene to generate a candidate second image, the deciding unit estimates whether average luminance of a part of the candidate second image corresponding to the dark area of the base image is greater than or equal to the base luminance, and if the estimating result is positive, the deciding unit assigns the candidate second image as the second image.

20. The system of claim 19, wherein if the estimating result is negative, the controlling unit further increases the second exposure time, the shooting unit utilizes the second exposure time to shoot the specific scene to generate another candidate second image, and the deciding unit estimates whether average luminance of a part of the another candidate second image corresponding to the dark area of the base image is greater than or equal to the base luminance.

21. The system of claim 12, wherein the combining unit combines the base image, the first image, and the second image into the HDR image corresponding to the specific scene.

22. The system of claim 12, wherein the combining unit combines at least the first image and the second image into the HDR image corresponding to the specific scene according to a response function g as follows:

$$g(Z_{ij}) = \ln E_i + \ln \Delta t_j,$$

wherein $Z_{ij}$ represents the $i^{th}$ pixel value in the $j^{th}$ image, $E_i$ represents scene radiance corresponding to the $i^{th}$ pixel value, and $\Delta t_j$ represents exposure time corresponding to the $j^{th}$ image.

\* \* \* \* \*